United States Patent
Tamura et al.

(10) Patent No.: US 7,345,694 B2
(45) Date of Patent: Mar. 18, 2008

(54) DOCUMENT SHEET ISSUING SYSTEM AND RECORDING MEDIUM FOR THE SYSTEM

(75) Inventors: Toshiyuki Tamura, Shizuoka-ken (JP); Shinichi Mizushima, Shizuoka-ken (JP); Kazuhide Takahama, Shizuoka-ken (JP); Takayuki Hiyoshi, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 1046 days.

(21) Appl. No.: 10/411,371

(22) Filed: Apr. 11, 2003

(65) Prior Publication Data

US 2003/0218784 A1    Nov. 27, 2003

(30) Foreign Application Priority Data

| Apr. 12, 2002 | (JP) | 2002-110232 |
| Jun. 18, 2002 | (JP) | 2002-176743 |
| Sep. 3, 2002 | (JP) | 2002-258155 |

(51) Int. Cl.
- *B41M 5/00* (2006.01)
- *B41M 5/124* (2006.01)
- *B41M 5/26* (2006.01)

(52) U.S. Cl. ............... 347/221; 428/32.39; 428/33
(58) Field of Classification Search ............... 347/221; 428/32.39, 33; 503/200
See application file for complete search history.

(56) References Cited

U.S. PATENT DOCUMENTS 6,800,342 B2 * 10/2004 Romano et al. ......... 428/32.24

FOREIGN PATENT DOCUMENTS

| JP | 62-67772 U | 4/1987 |
| JP | 11-42855 | 2/1999 |
| JP | 2001-202424 | 7/2001 |
| JP | 3327235 | 7/2002 |

OTHER PUBLICATIONS

Notice of Rejection for Japanese Patent Application No. 2002-285155.

* cited by examiner

*Primary Examiner*—Huan Tran
(74) *Attorney, Agent, or Firm*—Pillsbury Winthrop Shaw Pittman, LLP

(57) ABSTRACT

A document sheet issuing system suitable for manufacturing a product based on an ordering by a retailer issues a plurality of documents, e.g., guarantee card, user registration card, on which data including a name of retailer is printed during manufacturing. The issued documents are attached to a carton box in which manufactured product is packed before the product is delivered to thereby reduce troublesome operation by the retailer. The system uses a laminated medium including a lower document sheet and an upper document sheet peelably laminated on the lower sheet. A first data is printed firstly on the lower sheet through the upper sheet and a second data different from the first data is then printed on the upper sheet.

5 Claims, 15 Drawing Sheets

FIG.3(a)　　　　　　　　　FIG.3(b)

(a): Before printing　　101a　　(b): After printing　　101a

| Guarantee Card |
|---|
| Product Name : Personal Computer |
| Model Number : PCT-1000 |
| Serial Number : A01234567 |
| Manufacturer: Toshibatec Co.,LTD<br>6-78 Minami-cho Mishima-shi Shizuoka-ken Japan<br>411-8520 |
| Date of sales(day/month/year): |
| Computer Store: Toshibatechanbai Co.,LTD |
| Computer Store Address:<br>*- Ohito-cho Tagata-gun Shizuoka-ken Japan<br><br>Telephone:0558-76-<br>Facsimile :0558-76-** |

*A01234567

208

(Before printing side)

| Guarantee Card |
|---|
| Product Name: |
| Model Number: |
| Serial Number: |
| Manufacturer: Toshibatec Co.,LTD<br>6-78 Minami-cho Mishima-shi Shizuoka-ken Japan<br>411-8520 |
| Date of sales(day/month/year): |
| Computer Store: |
| Computer Store Address: |

(a): Top　　　　　　　　　(b): Back

Delivery Lable

Product Name : Personal Computer
Model Number : PCT-1000
S/N      : A01234567

To : Toshibahanbai Co.,LTD
*-** Ohito-cho Tagata-gun
Shizuoka-ken Japan 410-****
TEL: 0558−76−＊＊＊＊

Manufacturer:   Toshibatec Co.,LTD
6-78 Minami-cho Mishima-shi Shizuoka-ken
Japan 411-8520

TEL:0559-76-****

*A01234567

FIG.12(a)
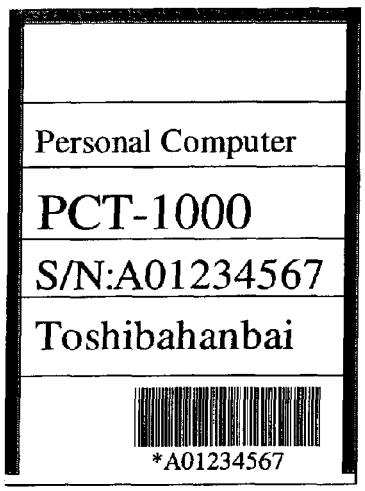
Print direction
FIG.12(b)
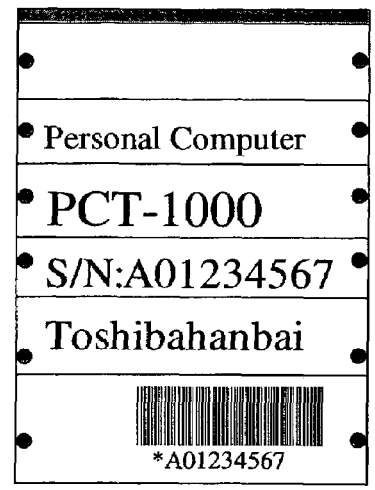
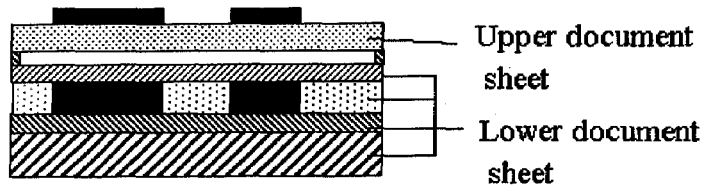
Upper document sheet
Lower document sheet
FIG.12(c)
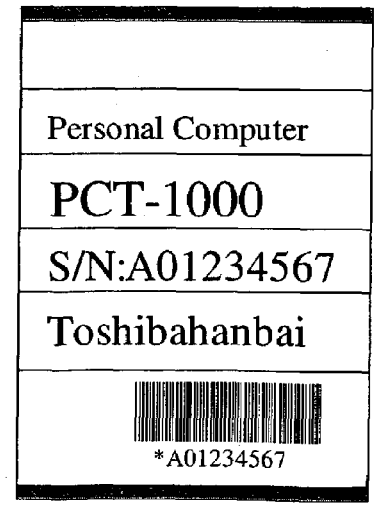

FIG.15

Guarantee Card (Top)     307     User Registration Card (Top)

| Guarantee Card | | Mishima 563 | POST CARD |
|---|---|---|---|
| Product Name: | | Please send this Leter until 3/31/2003 | To Toshibatec Customer Service User Registration Division 6-78 Minami-cho Mishima-shi Shizuoka-ken Japan 411-8520 |
| Model Number: | | | |
| Serial Number: | | | |
| Manufacturer: Toshibatec Co.,LTD 6-78 Minami-cho Mishima-shi Shizuoka-ken Japan 411-8520 | | Product Name : | |
| Date of sales(day/month/year): | | Model Number : | |
| | | Serial Number : | |
| Computer Store: | | Computer Store : | |
| Computer Store Address: | | Computer Store Address | |

DOCUMENT SHEET ISSUING SYSTEM AND RECORDING MEDIUM FOR THE SYSTEM

BACKGROUND OF THE INVENTION

1. Field of the Invention

This invention relates, in general, to a document sheet issuing system in which a document sheet, such as, e.g., guarantee card, user registration card, etc., is issued during manufacturing of a product based on the ordering data, e.g., product name, model number, seller name (orderer), specification (accessories), number of products ordered, and then is delivered to the seller, e.g., retailer, wholesaler, distributor, along with the manufactured product. In particular, the invention relates to the system in which document sheets respectively corresponding to the products to be manufactured are prepared based on the ordering data during the manufacturing of the products and the document sheets are attached to corresponding products respectively before shipping. The guarantee card and the user registration card are inevitably attached to the product when the product is delivered.

2. Description of Related Art

In a conventional manufacturing system for consumer products, e.g., household appliances, personal computers and so on, a manufacturer firstly forecasts a demand of such products to estimate an amount of products to be manufactured, produces such products based on the estimation and then the produced products are temporarily stocked in a warehouse. Upon a reception of supply ordering from a retailer through communication tools such as Internet, the products stocked in the warehouse are finally delivered to the retailer.

In the above-described system, the manufacturer prepares documents, e.g., guarantee card, user registration card, manuals or the like, required to the product beforehand and such documents are attached to the product at the final stage of manufacturing the product. Then, the documents are supplied to the retailer together with the product upon the reception of the supply ordering. Contents or forms of documents supplied to different retailers are the same although each retailer to which products are supplied is different to one another because the documents are prepared before the reception of the supply ordering from the retailer. Therefore, the retailer may have a troublesome operation when the retailer sells the product to a customer.

In more detail, when a product is sold at a retail store, a store clerk picks out a guarantee card and a user registration card from a carton box in which the product is packed so that the name of the retail store is stamped or written on the guarantee card and the date of purchasing the product is also stamped or written on the card. Therefore, operations that the guarantee card is picked out and the name of the retail store and the date of purchasing the product are stamped or written on the guarantee card are necessitated by the store clerk.

To simplify the operations above, the store clerk does not conduct such operations when selling the product and instead, the customer is requested that a receipt issued when purchasing the product and the guarantee card on which no store name is stamped is kept.

When the product is out of order, the user (customer) shows the receipt and the guarantee card at the store from which the product was bought to request a repair of the product. Necessary information is then stamped or written on the guarantee card by the store clerk.

Furthermore, in the above-described system, manufacturers have a risk that the temporarily stocked products in the warehouse become a dead inventory if the sales amount of the product is not increased as opposed to its forecast. In order to reduce such risk, it is considered to change from a manufacture based on the forecast to a manufacture upon a supply ordering.

In the manufacture based on a supply ordering, it is inevitable to take time from the reception of the supply ordering to the delivery of a product although it is expected to resolve the above-described risk.

To compensate for the above drawback, new services by manufacturers have been expected by retailers and/or customers.

SUMMARY OF THE INVENTION

Accordingly, it is an object of the present invention to provide a new document sheet issuing system applied to the manufacture of consumer products.

It is another object of the invention to provide a system which reduces operations required when selling products to customers.

To accomplish the above objects, a document sheet issuing system includes a database for storing ordering data from a seller relating to a product to be manufactured, the ordering data including at least a name of the seller and a name of the product; an input device for inputting the ordering data into the database upon the reception of a supply ordering including the ordering data from the seller; a recording medium having a data recording field to be filled with the ordering data, the recording medium being inevitably attached to the product; a reader for reading out the ordering data from the database; and a printer for recording at least the name of the seller of the ordering data from the reader at the data recording field of the recording medium before the product is delivered to the seller, wherein the recording medium that the ordering data have been recorded is attached to the product before the product is delivered to the seller. The recording medium may include a lower document sheet and an upper document sheet laminated on the lower document sheet. The upper and lower document sheets may temporarily be stuck to one another so that the upper document sheet is peelable from the lower document sheet after the printing is completed.

BRIEF DESCRIPTION OF THE DRAWINGS

FIG. 3(a) is a plan view of an upper sheet of the laminated medium on which predetermined data fields are printed;

FIG. 3(b) is a plan view of the upper sheet on which data are printed in the predetermined data fields;

FIG. 12(a) is a plan view of one example of a laminated medium which is formed with upper and lower sheets peelably bonded;

FIG. 12(b) is a plan view of another example of the laminated medium shown in FIG. 12(a);

FIG. 12(c) is a plan view of still another example of the laminated medium shown in FIG. 12(a);

FIG. 15 is a plan view of a recording medium including a guarantee card and a user registration card on which predetermined data fields are printed.

DETAILED DESCRIPTION OF A PREFERRED EMBODIMENT OF THE INVENTION

Figure 1:
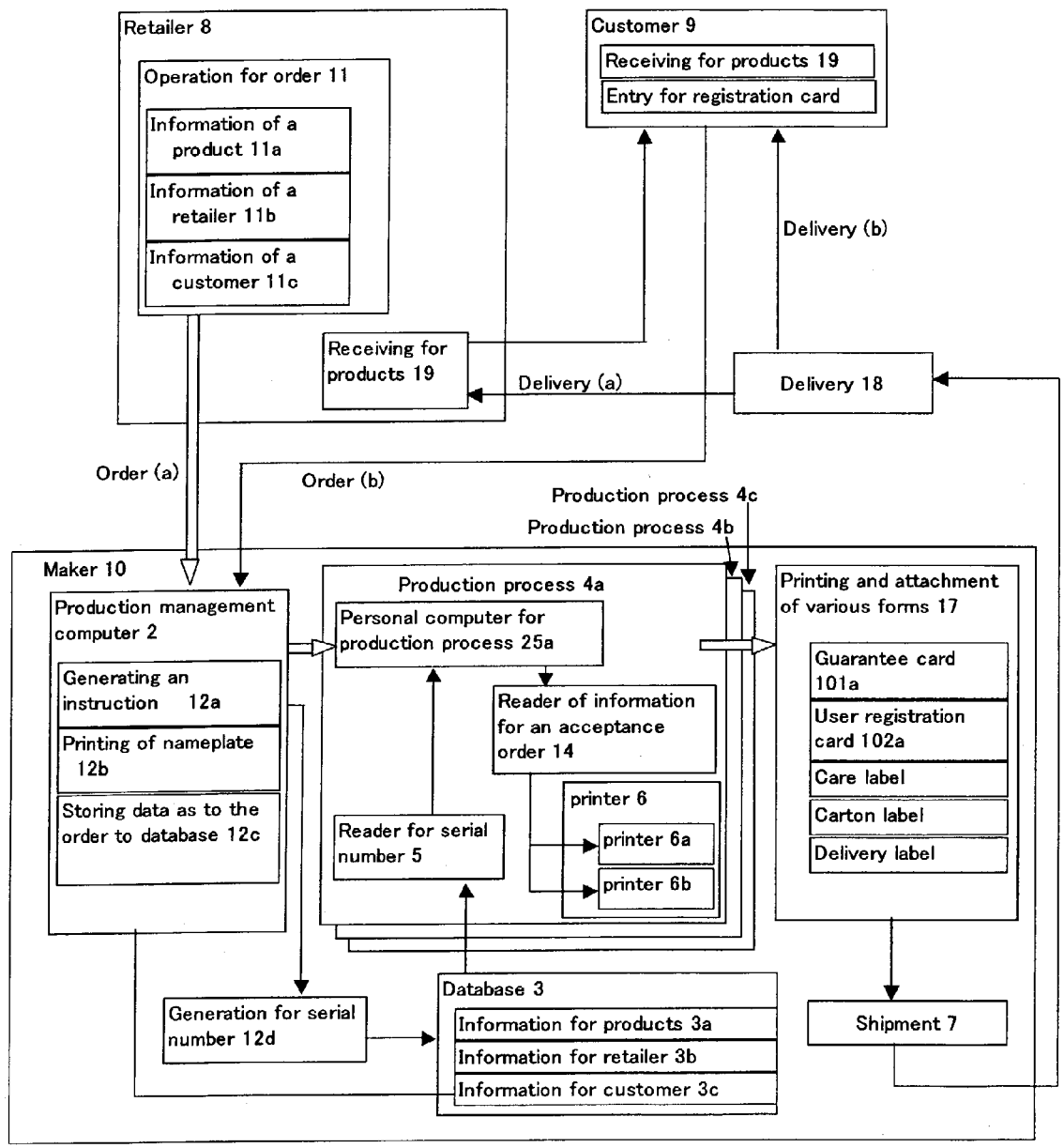
FIG. 1 is a block diagram illustrating a system of one embodiment of the present invention.

Referring to FIG. 1, a preferred embodiment of the present invention will be now described in detail.

An order (a) to a maker 10 is made by a seller, such as, e.g., retailer 8, wholesaler, distributor, upon a reception of the purchase order from a customer. A customer 9 also can make an order (b) directly to maker 10 through a communication tools, e.g., Internet, to buy a product. In this embodiment, however, description is made assuming that a retailer as a seller issues supply order (a) to the maker 10.

When maker 10 receives the order (a) from a retailer 8, a production management computer 2 generates manufacturing serial numbers respectively corresponding to products to be manufactured and stores to database 3 ordering data input through an input device, such as, e.g., key-board, barcode scanner, on the basis of the order (a). The manufacturing serial number is a unique number to each product to identify a specific product during the manufacturing. The ordering data is stored to database 3 based on the manufacturing serial number, acting as a key or an address pointer, corresponding to each product to be manufactured.

The product is manufactured by production processes 4a, 4b, and 4c based on the ordering data stored in database 3. During the execution of respective production processes 4a, 4b, and 4c, document sheets required to the products are printed by printers 6a and 6b. The document sheets are attached to or packed with each product, and delivered to the retailer 8 (Delivery (a)) in accordance with the order (a).

Operation for issuing the order provides maker 10 with data which include information of a product 11a, information of a retailer 11b, information of a customer 11c, and information of a delivery date. The information of a product 11a includes name of the product, model number, optional specification (accessories), etc. The information of a retailer 11b includes name of the retailer 11b, name of a branch office of the retailer 11b, address and telephone number of the branch office, and so on. The information of a customer 11c includes name, address, telephone number, occupation, and age, etc. of a customer 9.

In response to the order (a), production management computer 2 generates a manufacturing serial number 12d in a reception process to manage production of the ordered product, as described above. The manufacturing serial number 12d is generated or issued corresponding to the number of products to be manufactured. Computer 2 also instructs to print a production-instruction 12a and nameplate 12b, and stores the data of the order (a) to database 3 as indicated by 12c in FIG. 1. The data stored in database 3 may be the information of product 3a and the information of retailer 3b if the purchase order is the order (a). Otherwise, the data may be information of product 3a and information of customer 3c. The data stored in database 3 are managed and addressable with the manufacturing serial number 12d, acting as a key, generated to each product, respectively. The manufacturing serial number 12d is coded to a machine-readable code such as a bar cord and stored in database 3 to thereby facilitate mechanization or automation during process of manufacturing or logistics.

Based on the operation for receiving the order (a), a detailed specification of an ordered product is defined so that the production-instruction 12a is issued to start manufacture of the ordered product. In accordance with the production-instruction 12a, various document sheets 17 which are required to produce or deliver the product are printed at respective production processes 4a, 4b, and 4c. The various document sheets, for example, include a nameplate 12b on which a manufacturing serial number for each product is printed, a care label that indicates treatment of the product during the production processes or cautions to user when using the product. The document sheets also include a guarantee card 101a, a user registration card 102a, a carton label and a delivery label to be attached to a carton box in which a product is packed upon completion of the product.

When production of the product begins, manufacturing serial numbers are issued and printed on respective nameplates 12b. Each nameplate 12b is attached to respective products and therefore, each product can be specified by the manufacturing serial number during the production. Upon reading the manufacturing serial number from the nameplate 12b attached to a specific product, a specific area on the database 3 is addressed with the manufacturing serial number 12d. Data required to issue each document sheet is read out of the specific area of the database 3 and the data are printed on the document sheet by printer 6 provided at a production line (production process 4a). A completed product is then delivered to the retailer after document sheets are attached to the product. The retailer receives the product and sends the product to the customer 9 without conducting any further operation. Customer 9 fills the user registration card (one of the document sheets attached to the product) with necessary data and sends back the card to maker 10 after receiving the product.

In more detail, production of the ordered product is managed based on the production-instruction 12a corresponding to a specific manufacturing serial number 12d. At a prescribed timing of production process 4a, 4b, or 4c, a manufacturing serial number 12d on the nameplate 12b is read out by a serial-number reader 5 and input to a personal computer 25a. The personal computer 25a uses this manufacturing serial number 12d to read a necessary data out of the database 3 and issues document sheets required at this production process through printers 6*a* and 6*b*. At this time, the manufacturing serial number is also printed on the document sheets.

Computers are respectively located at a production line of each production process 4*b* or 4*c*, as the same as computer 25*a* of production process 4*a*, and each communicates with database 3 through a local area network (LAN). Respective document sheets is issued at an appropriate production process 4*a*, 4*b* or 4*b* by the computer and the printer. For example, if the document sheet is a care label and is issued at one of the production processes 4*a*, the care label is issued by computer 25*a* and printer 6. After that, the care label is attached to a semi-fabricated product. At this time, data required to issue the care label are read out of the database 3 by computer 25*a* using manufacturing serial number 12*d* unique to the product being manufactured. If a document sheet is a guarantee card 101*a* and is issued at a production process 4*c*, data required to issue the guarantee card 101*a* are read out of the database 3 by a computer and printed by a printer at the production process 4*c*. The data obtained by the computer include a product name and a model number from a product information database 3*a*, and the name of seller (retail store) and the address thereof from a seller information database 3*b*. If the user registration card 102*a* is also issued at the production process 4*c*, data are also read out of database 3*a* or 3*b*. After that, it is confirmed that the manufacturing serial number printed on such printed document sheets and the manufacturing serial number printed on the nameplate attached to the product are the same so that appropriate document sheets are attached to the product before shipping.

Figure 2:
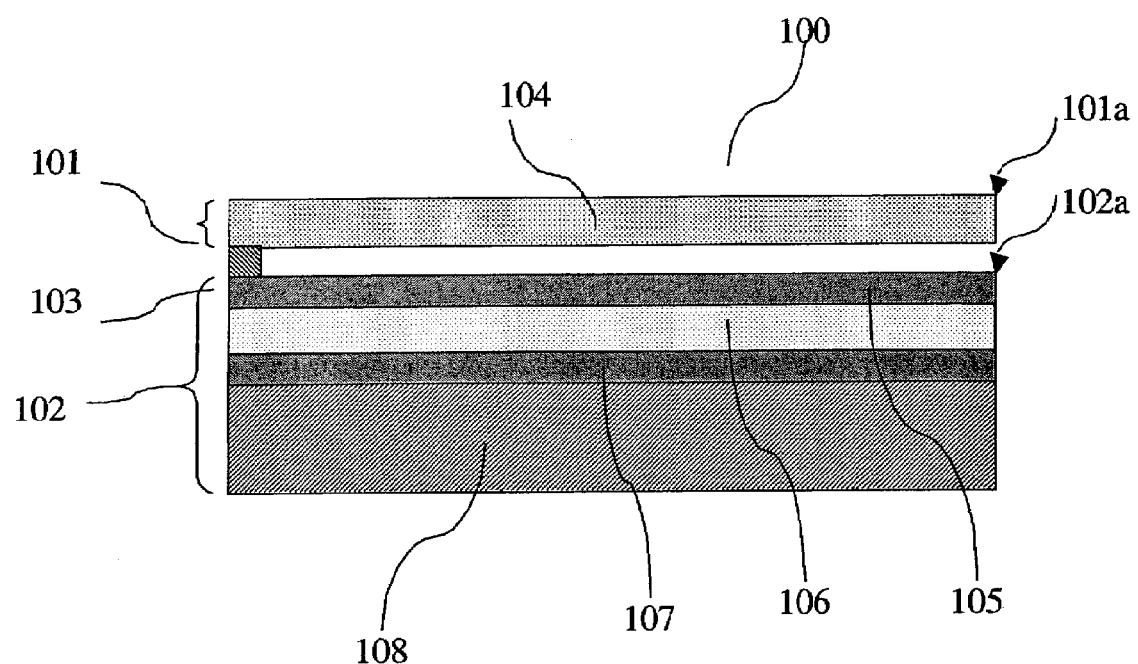
FIG. 2 is a sectional view of an example of a laminated medium used in one embodiment in FIG. 1.

Referring to FIG. 2, construction of the document sheets will be described in more detail. In the illustration, a guarantee card and a user registration card are made as document sheets.

A laminated recording medium 100 is used. The medium 100 is structured with an upper sheet 101 serving as a guarantee card 101*a* and a lower sheet 102 serving as a user registration card 102*a*. The upper sheet 101 is a high quality paper and the lower sheet 102 is a thermal recording paper. One of the edge portions of the upper sheet 101 and a corresponding edge portion of the lower sheet 102 are peelably stuck with an adhesive. Due to the surface smoothness of a high quality paper, the upper sheet (guarantee card ) 101 can be printed by a thermal transfer printer using a thermal transfer ink ribbon. The lower sheet (user registration card) 102 is a thermal recording paper that an undercoat layer 107, a thermal color layer 106 and a passivation layer 105 are layered in order on a base 108. The lower sheet 102 generates color thereon when heat generated by thermal print head is applied to the sheet 102 through the upper sheet 101. A thickness of upper sheet 101 should be controlled to less than a prescribed thickness, taking account of the thermal insulation depending on the thickness thereof. For example, in consideration of laminating the upper sheet 101 on the passivation layer 105, a base of the upper sheet 101 preferably has its surface smoothness of more than 200 second, basis weight of 25 to 40 gram/m$^2$ more preferably 30 to 40 gram/m$^2$, and bulk density of 1.0 to 1.3 gram/m$^2$. The base can be provided by the manufacturing process described in the Japanese laid open patent application No. 2001-180123. A glassine paper or a high quality paper can also be used for the base. As for lower sheet 102, a thermal recording paper, model 150LAB, made by Ricoh company, Ltd may be used.

Referring to FIG. 3, it is described how to make a guarantee card and a user registration card using the laminated recording medium 100.

The upper sheet 101 of laminated recording medium 100 forms a guarantee card 101 a. As shown in FIG. 3*a*, the guarantee card 101*a* has a plurality of data recording fields containing a product name field, a model name field, a manufacturing serial number field, a name of manufacturer field, a date of sales field, a retailer name (orderer) field, and a retailer address field. A title of the card "GUARANTEE CARD" and label of each field are printed beforehand, as shown in FIG. 3*a*.

An actual data of each field of the card 101*a* are printed using a thermal transfer printer 6*a*. As described above, data are previously stored in database 3 before the production begins. To obtain necessary data, a manufacturing serial number 12*d* is firstly read out of the nameplate 12*b* attached to the product being produced. Next, data stored in the database 3 are read out by addressing corresponding area of the database 3 using the manufacturing serial number 12*d*. In this case a product name, a model name, a retailer name (orderer), and a retailer address are read, as necessary data, from the database 3 and printed at corresponding data recording fields. The manufacturing serial number 12*d* may be read out of the database 3 if the number 12*d* has been stored in the database 3 and it may be used to check whether the manufacturing serial number 12*d* from the nameplate 12*d* coincides with the manufacturing serial number 12*d* from the database 3.

FIG. 3*b* shows one of the print samples of the guarantee card 101*a*. A product name (Personal Computer), a model name (PCT-1000) and a serial number (A01234567) are printed at the corresponding data recording fields. A manufacturer (Toshibatec Co., LTD) and its address and a retailer store or a distributor (Toshibatec hanbai) and its address are also printed at each field. In addition, the manufacturing serial number 12*d* is coded to a machine readable code 208, e.g. bar-code, and the coded number 208 is printed at the bottom of the card 101*a*. The above-described print is carried out by the thermal transfer printing with a thermal transfer ink ribbon. The retailer may input the manufacturing serial number 12*d* into its computer through a bar-code reader when the retailer receives the product from maker 10 and may use the serial number 12*d* as a key after that. In the above-described embodiment, the manufacturing serial number 12*d* is coded to a bar-code. However, the manufacturing serial number 12*d* may also be coded to a two-dimensional code.

Figure 4A:
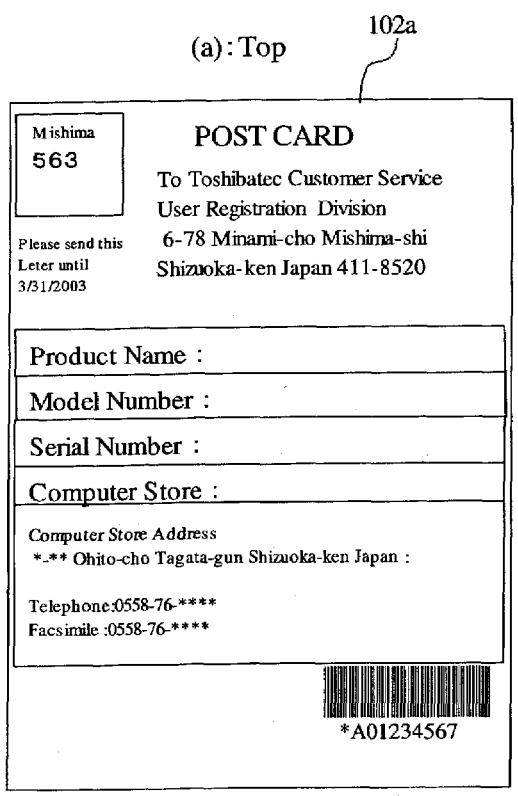
FIG. 4(a) is a plan view of a top side of a lower sheet of the laminated medium shown in FIG. 2 on which predetermined data fields are printed.
Figure 4B:
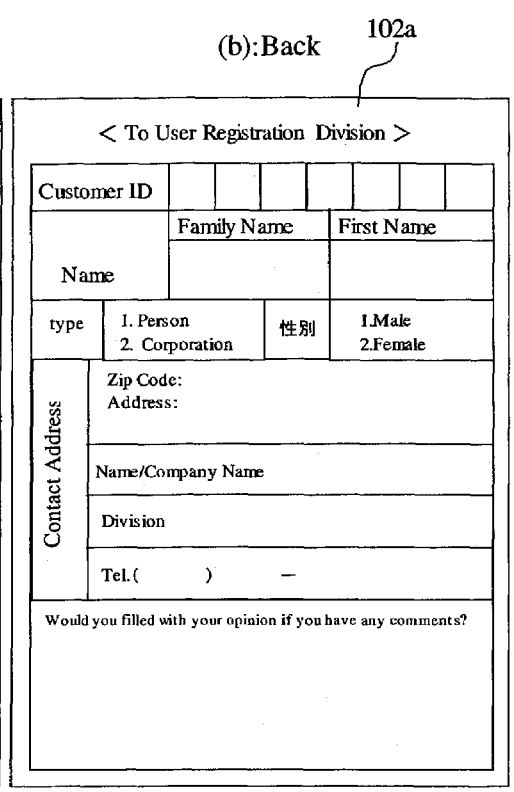
FIG. 4(b) is a plan view of a back side of the lower sheet on which predetermined data fields are printed.

FIG. 4 shows a user registration card 102*a* before printing each data. FIG. 4*a* shows a top face of the user registration card 102*a* and FIG. 4*b* shows the back face thereof. The top face of the card 102*a* is previously printed in the form of a post card. A plurality of data recording fields including a product name field, a model number field, a manufacturing serial number field, a retailer field and its address field are printed on the top face beforehand. Labels of respective data recording fields and an addressee (maker) and its address are also printed beforehand. Each data recording field is filled with corresponding data during manufacture of the product by the same processes as those of the guarantee card. However, print of the data on the top face is effected by a thermal head through the upper sheet 101(guarantee card 101*a*) without using a thermal transfer ink ribbon. A detail printing operation thereof will be described later.

Figures 5A, 5B:
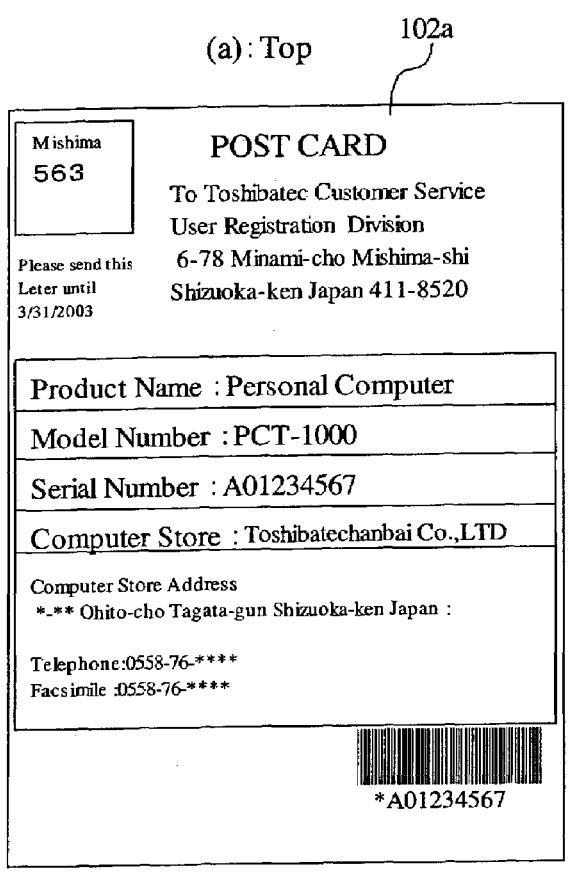
FIG. 5(a) is a plan view of the top side of the lower sheet on which data are printed in the data fields.
FIG. 5(b) is a plan view of the back side of the lower sheet after the top side is printed.

FIG. 5 shows a result of the printing on the user registration card 102*a*. FIG. 5*a* shows one of the print samples of the top face of the user registration card 102*a* and FIG. 5*b* shows the back face thereof where no print is carried out during production processes. The data recording fields of the back face of the card 102a are filled out by a customer when he or she receives the product from the retailer.

Figure 6:
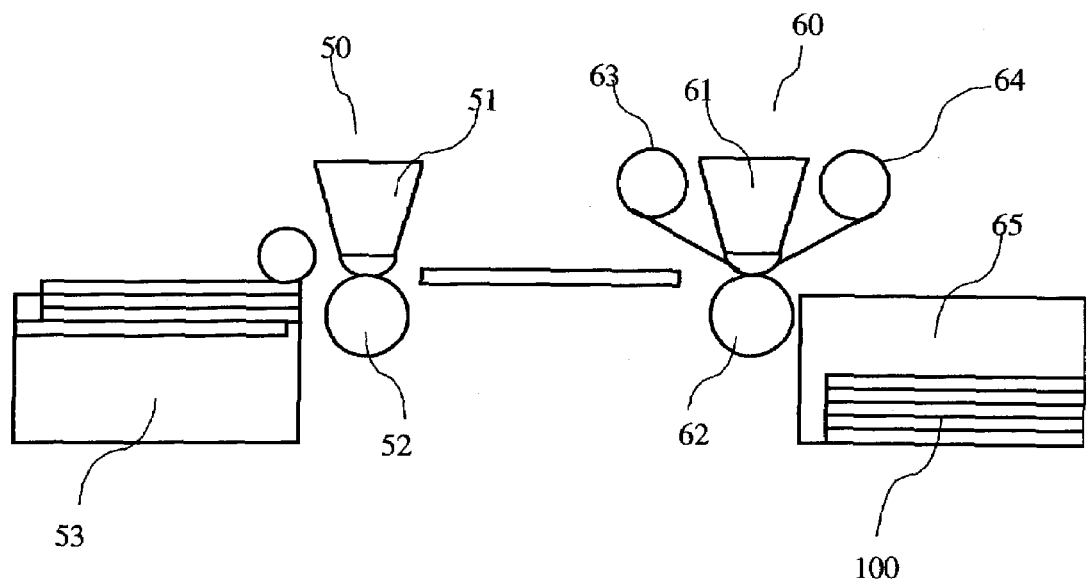
FIG. 6 is a schematic diagram of a printer of one embodiment shown in FIG. 1.

With reference to FIG. 6, a printer 6 which is used to print data on a laminated recording medium 100 (guarantee card and user registration card) and its printing operation will be described in more detail. The printer 6 is comprised of a first print unit 50, a second print unit 60, a supply paper tray 53, and a discharge paper tray 65. In this embodiment, a dual color barcode printer CI200 produced by Toshiba Tec Corporation was used. The printer CI200 was modified to be suitable for this embodiment. The first print unit 50 comprised of a thermal print head 51 and a platen roller 52 employs a thermal print method in which a portion of thermo-sensitive layer provided on a recording medium generates color when heat energy generated by the thermal print head 51 is applied to the portion thereof. The second print unit 60 comprised of a thermal head 61, a platen roller 62, an ink ribbon supply device 63, an ink ribbon take-up device 64 and a thermal transfer ink ribbon extending between two devices 63 and 64 employs a thermal transfer print method in which waxed ink on the thermal transfer ink ribbon is transferred to a recording medium when heat energy generated by thermal print head 61 is applied to the ribbon.

A plenty of the above-described laminated recording mediums 100 are stacked in the supply paper tray 53 and the upper most laminated recording medium is fed to the first print unit 50 by a feed roller to print data on the lower sheet 102 of the laminated recording medium 100.

The lower sheet 102 of laminated recording medium 100 is used as a user registration card and thus data required to print the user registration card is read from the database 3 based on the manufacturing serial number, as described above. Thermal energy is generated by the thermal head 51 of the first print unit 50 according to the data read from the database 3 and is applied to the lower sheet 102 through the upper sheet 101 to effect printing on the sheet 102.

After the printing on the lower sheet 102, the laminated recording medium 100 is further fed to the second print unit 60 to print data on the upper sheet 101 using as a guarantee card. Thermal energy is generated by thermal head 61 of the unit 60 according to the data read from the database 3, as described before, and is applied to the upper sheet 101 through the thermal transfer ink ribbon. Ink applied on the ribbon is fused and is transferred onto the upper sheet to effect printing. Then, printing is completed and the laminated recording medium 100 is finally received in the discharge paper tray 65.

As described above, printing on upper sheet 101 and lower sheet 102 of the laminated recording medium 100 is carried out by different printing operations by print units 50 and 60 and each printing condition of print units 50 and 60 will be described in more detail.

In the printing operation by the first print unit 50, a thermal recording sheet is used as the lower sheet of laminated recording medium 100 and the printing on the thermal recording sheet is carried out in a printing condition in which a heat energy (E1) generated by thermal head 51 is of 7 mW×600 μsecond and print speed is of 2 inch/second. On the other hand, in the printing operation by the second print unit 60, a plain paper is used as the upper sheet and the printing on the plain paper is carried out in a printing condition in which a heat energy (E2) generated by thermal head 61 is of 7 mW×300 μsecond and print speed thereof is of 2 inch/second.

In this connection, printings on upper sheet 101 and lower sheet 102 of laminated recording medium 100, each of which is different to one another, can be executed by the following conditions even if first print unit 50 and second print unit 60 employ similar thermal printing method. Heat energy (E1) generated by first print unit 50 is greater than heat energy (E2) generated by second print unit 60 and heat energy (E2) is controlled so that the printing on second sheet 102 is not effected by such energy (E2) through first sheet 102. By controlling respective energies (E1) and (E2), as described above, printing on upper sheet 101 (plain paper) is not effected when the heat energy (E1) is applied to second sheet 102 through upper sheet 101 to effect the printing on second sheet 102, on the one hand, and printing on lower sheet 102 having a thermal sensitive layer is not effected when the heat energy (E2) is applied to upper sheet 101 to effect printing on upper sheet 101 by the thermal transfer ink ribbon, on the other hand. Thus, independent printing on upper sheet 101 or lower sheet 102 can be effected even if upper sheet 101 and lower sheet 102 are laminated and heat energy (E1) or (E2) is applied on the laminated both upper and lower sheets 101 and 102, simultaneously.

FIG. 7a to FIG. 7d show print samples printed by printer 6.

Figure 7A:
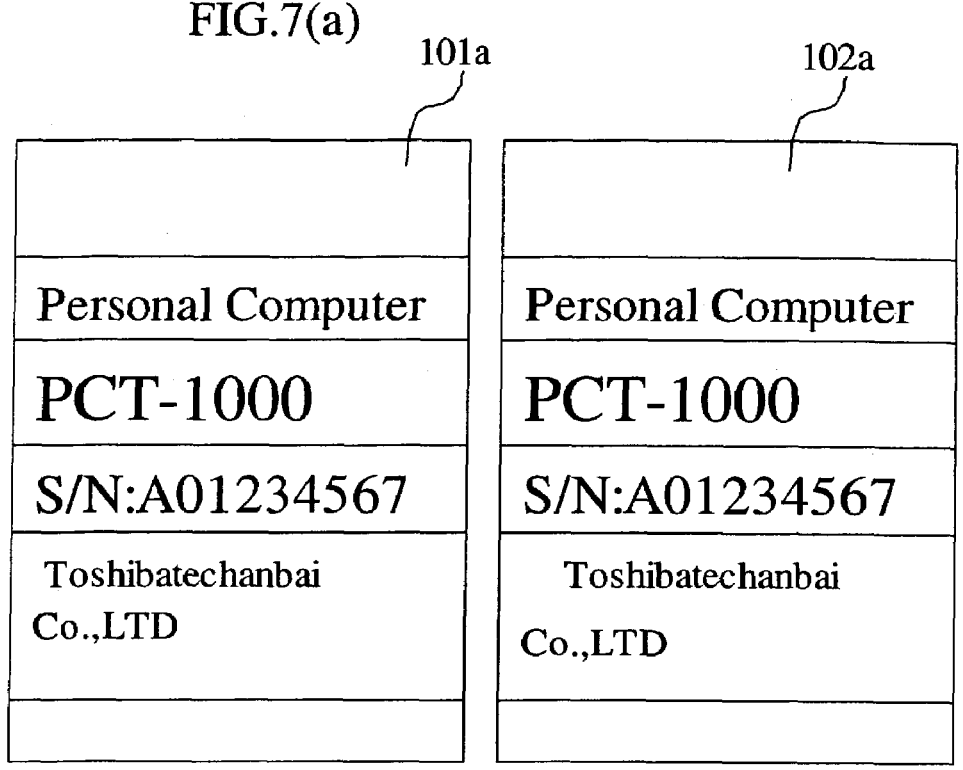
FIG. 7(a) is a plan view of upper and lower sheets on which an identical data is printed.
Figure 7B:
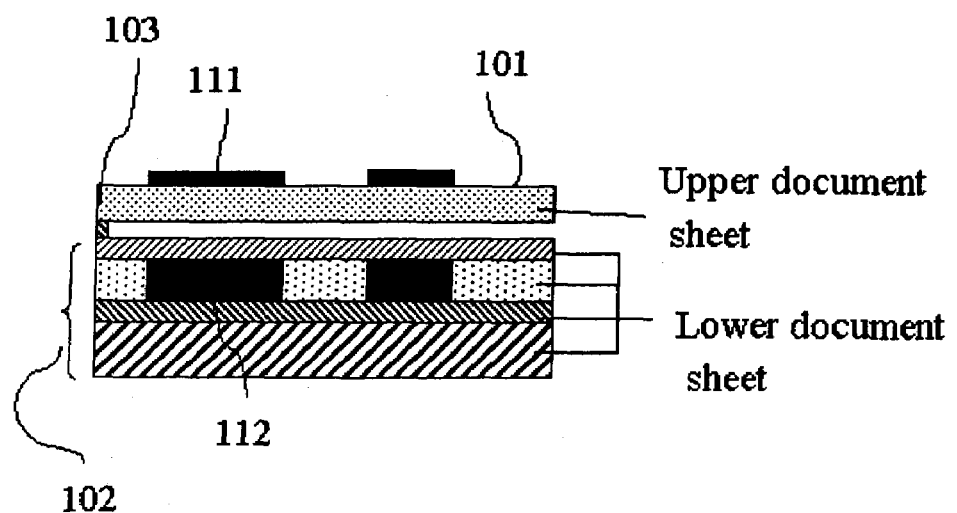
FIG. 7(b) is a schematic side view of the upper and lower sheets shown in FIG. 7(a)

FIG. 7a illustrates guarantee card 101a and user registration card 102a that the same data is printed at the same location of guarantee card 101a (upper sheet 101 of laminated print medium 100) and user registration card 102a (lower sheet 102 of laminated print medium 100). A sectional view schematically illustrated in FIG. 7b with respect to FIG. 7a shows that a black-solid portion 111 indicates a printing portion on upper sheet (guarantee card) 101 by second print unit 60 and a black-solid portion 112 also indicates a printing portion on lower sheet 102 at the same location as that of upper sheet 101 by first print unit 50.

Figure 7C:
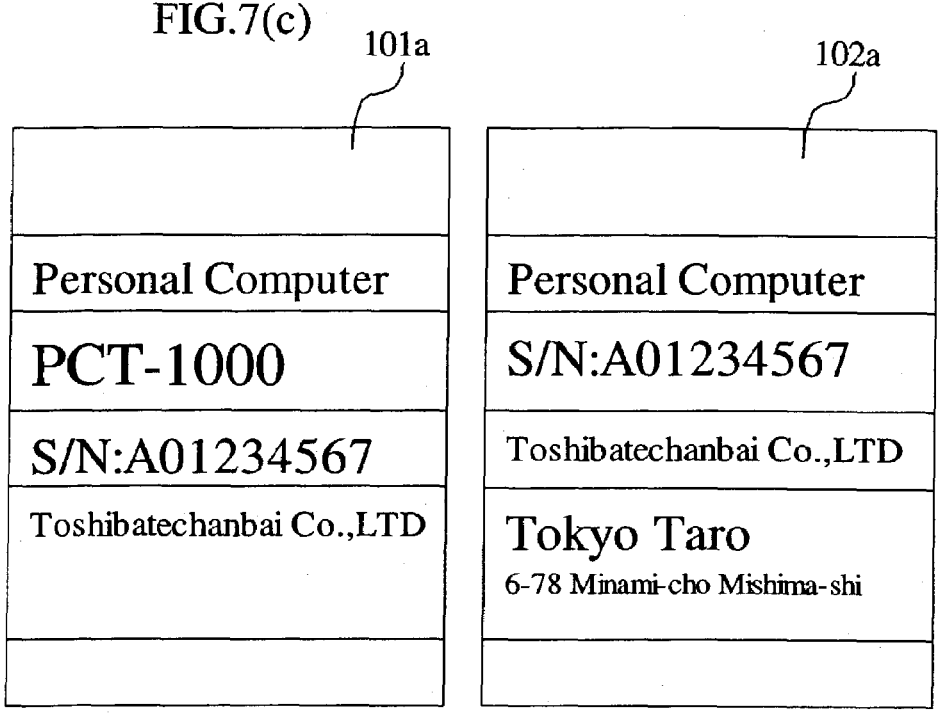
FIG. 7(c) is a plan view of the upper and lower sheets on which a different data is printed.
Figure 7D:
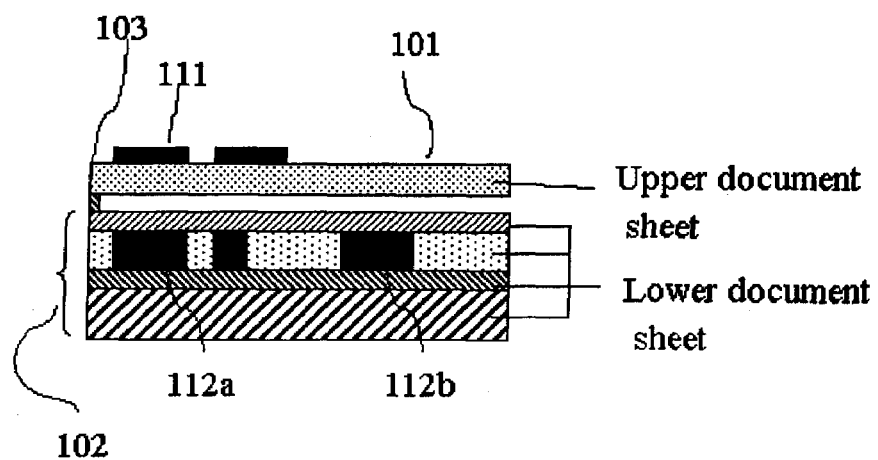
FIG. 7(d) is a schematic view of the upper and lower sheets shown in FIG. 7 (c)

FIG. 7c illustrates guarantee card 101a and user registration card 102a that print data on guarantee card 101a is different from print data on user registration card 102 except for product name "Personal Computer". A sectional view in FIG. 7d schematically shows a result of the printing by first and second print units 50 and 60. Since two different kinds of print methods including a thermal print method and a thermal transfer print method are employed, same print images or different print images at the same location or the different location of upper sheet 101 and lower sheet 102 can be obtained. As each of the print methods employs a thermal print head, identical thermal print heads can be applied to first and second print units thereby resulting in a merit that common electric control circuit can be used. In place of the thermal transfer print method for the second print unit 60, other print method, such as an ink jet printing method or a wire dot printing method can be used.

Print sequence of first print unit 50 and second print unit 60 is described. The printer 6 is assembled so that first print unit 50 prints print data on lower sheet 102 before second print unit 60 prints print data on upper sheet 101, by using a print sequence controller built in printer 6. If the first print unit 50 prints print data on upper sheet 101 prior to printing by second print unit 60, second print unit 60 may possibly pose blur or contamination on image previously formed on upper sheet 101 when second print unit 60 prints print data on lower sheet 102. In detail, if the image is firstly formed on the upper sheet with waxed ink from the thermal transfer ribbon and then an image is formed on the lower sheet through the upper sheet, the waxed ink on the upper sheet is re-melted with the heat energy generated by second print unit 60 and scratched patterns on the upper sheet or deterioration of thermal print head occur because of the contact to the waxed ink with the thermal print head or the waxed ink adhesive to the thermal print head. To prevent the print quality degradation due to the scratched pattern, it is needed that first print unit 50 prints print data on lower document sheet prior to the print on the upper document sheet.

As described above, a thermo sensitive layer formed on lower sheet 102 generates color by heat energy which runs through upper sheet 101 and thus, an appropriate thickness of upper sheet 102 is required so that the heat energy causes the thermo sensitive layer to generate color. The thickness of upper document sheet is experimentally designed to take into account of thermo sensitivity of the thermo sensitive layer, a kind of recording mediums, printing speed and so on. For example, in case that a glassine paper or a high quality paper being approximately 50 micron thickness is used as upper sheet 101, a required image can be obtained by using a thermal head mounted on thermal printers which are practically used at present. Used for upper sheet 101 is also a glassine paper or a high quality paper as it is, which does not have a thermo sensitive layer because the upper medium does not need to generate color by heat energy generated by a thermal head when print is effected on lower sheet 102.

As shown in FIG. 2, upper sheet 101 and lower sheet 102 are integrally bonded at corresponding edges by peelable adhesive 103 interposed therebetween. Thus, a positional relationship between printed images recorded on upper sheet 101 and that on lower sheet 102 is kept constant. The laminated print medium 100 formed with upper sheet 101 and lower sheet 102 can be used as an integral form or as separated forms if being required.

Described in detailed are a care label, carton label, and delivery label, each of which is used as an attachment necessary for an ordered product or delivery of the product.

Figure 8:
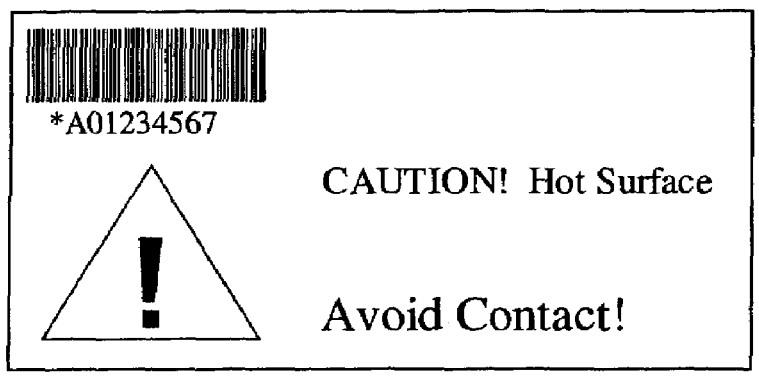
FIG. 8 is a plan view of a care label in one embodiment.

FIG. 8 shows a care label which is attached on a high-temperature part of a product to draw a customer's attention to such a high temperature part. Data to be printed on the care label is read from database 3 based on the manufacturing serial number 12a, and is printed in place. A required care label can be specified from a various kinds of care labels at a prescribed production point by the manufacturing serial number 12a. The manufacturing serial number and machine-readable code corresponding to the serial number are printed on the care label. Even if an operation in which a care label is attached to a product at a production process is missed, the product without the care label can be easily specified by reading out the machine-readable code recorded on the remaining care label, or by confirming the serial number at a final stage of the manufacture.

Figure 9:
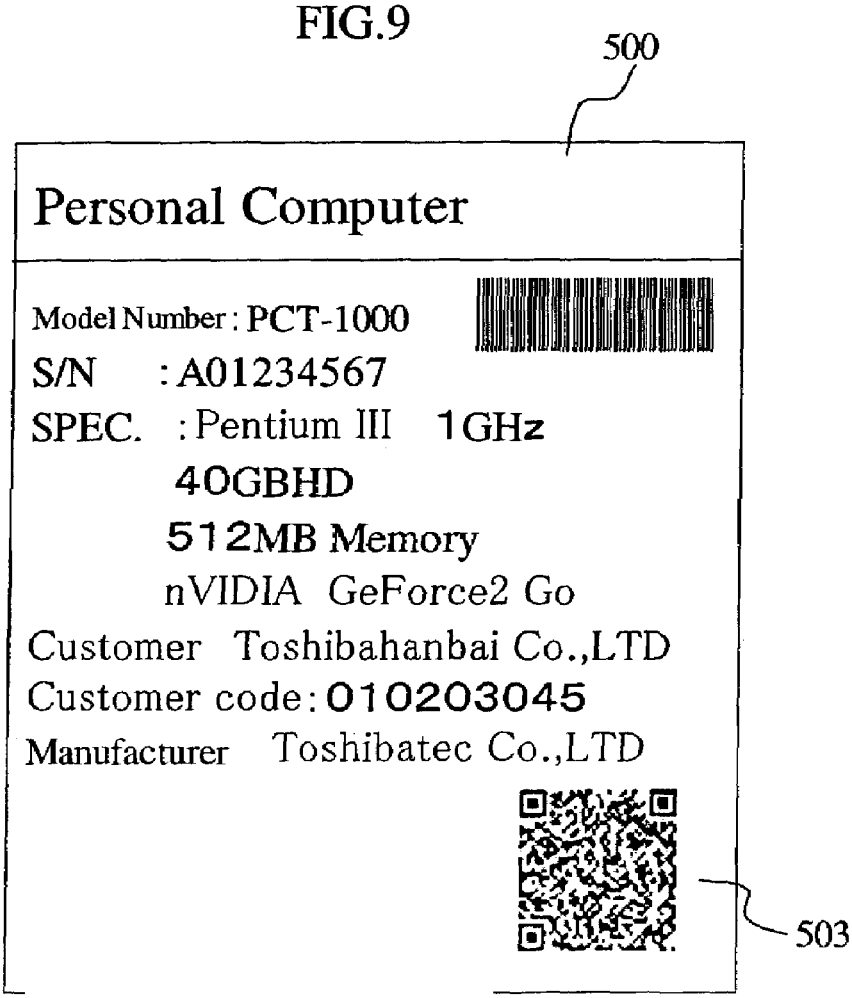
FIG. 9 is a plan view of a carton label in one embodiment.

FIG. 9 shows a carton label 500 which describes a detail of the product packed in a cardboard box. A retailer can identify the content in the cardboard box and the specification thereof (product) from carton label 500 without opening the cardboard box when the retailer receives the cardboard box. Printed on the carton label 500 are a product name (Personal Computer), a model number (PCT-1000), a manufacturing serial number (A01234567), a bar code corresponding to the manufacturing serial number, and a two-dimensional code 503 to which specification of the product and detailed information of the product are coded. Conventionally, it is required to open the cardboard box to take out a product specification document from the box when confirming the product detail information. In this embodiment, however, since the two-dimensional code is printed on the carton label and the label is stuck on the cardboard box in which the product is packed, such troublesome operation as describe above is not required. Data in the two-dimensional code is input to a computer through a two-dimensional code reader and is displayed after decoding.

Figure 10:
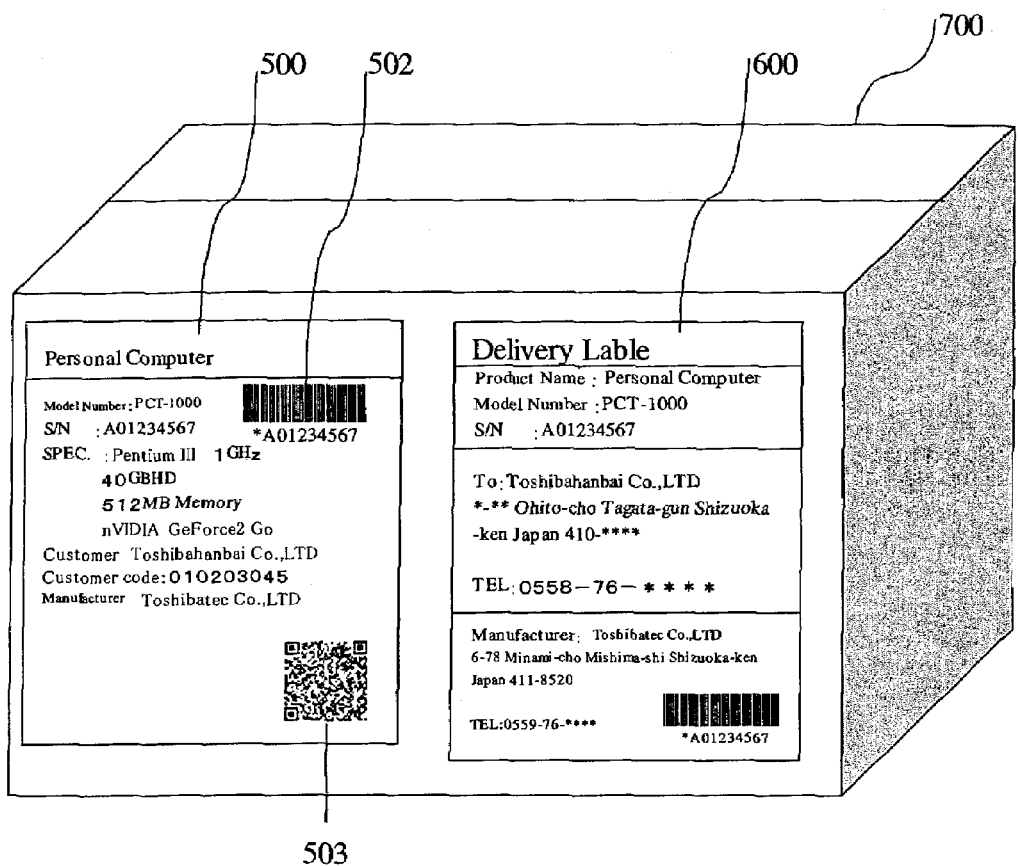
FIG. 10 is a perspective view showing a carton box on which carton label and delivery label are stuck.

FIG. 10 shows a delivery label 600 and a carton label 500 stuck on a cardboard box 700. The retailer can immediately confirm the product and the specification thereof by reading the two-dimensional code on carton label 500 to thereby facilitate inventory management or operation of registration upon sale.

Figure 11:
FIG. 11 is a plan view of a delivery label in one embodiment.

FIG. 11 shows a delivery label, on which data having a product name, a model number, a manufacturing serial number, a retailer name, address of the retailer, maker name and a bar-code encoding the manufacturing serial number are printed. These print data are read from database 3 including product information database 3a and seller information database 3b based on the manufacturing serial number 12d during the production processes. Since the retailer name and its address who receives a product can be obtained from database 3 during the production processes, a delivery label 600 is issued during the production processes and can be attached to a cardboard box together with packing the product. Thus, the product can be delivered to an appropriate addressee. Care label 400, carton label 500, and delivery label 600 can be printed by a conventional barcode printer such as a thermal transfer printer or a thermal printer. In this embodiment, a barcode printer B-600 manufactured by Toshibatec was used to print such labels.

Conventionally, document sheets including a guarantee card, a user registration card, care labels, carton label and delivery label are prepared prior to the manufacture of a product and manufacturing serial numbers are also printed when preparing the document sheets. In this conventional case, reissue or rearrangement of manufacturing serial numbers to document sheets is needed when a condemned product is found during production processes. Rearrangement of manufacturing serial numbers is a troublesome operation and an incorrect matching between document sheets and products being manufactured may occur. In this embodiment, however, these document sheets necessary for a product are printed on demand, namely, during or end of the production processes, in accordance with a manufacturing serial number printed on the nameplate which is firstly attached to the product and thus such troublesome operation can be eliminated. In addition, the manufacturing serial number is printed on the document sheets when data are printed on the document sheets and thus an incorrect matching between document sheets and products being manufactured does not occur.

As described above, because information for a retailer including store name, address, and telephone number is printed in place on a guarantee card and user registration card before delivering the product, the retailer is not required to fill them. The retailer simply sends the product to the customer without taking any further operation. Furthermore, user registration can be performed by the following procedures. The customer fills out the user registration card 102a and sends it to a maker when he or she received the product. At the maker, a bar-code printed on the card 102a is read to obtain the manufacturing serial number by decoding the bar-code and data on the card 102a are input to the database 3. At this time, the data on the card 102a are stored to a customer information database 3c.

[Embodiment 1 of Recording Medium]

Jamming by the upper sheet of a laminated recording medium may occur when the laminated medium is printed by printer 6 as shown in FIG. 6. As the laminated medium is fed to printing position between a stationary thermal print head 51 and a rotational platen roller 52, a shearing force is generated between an upper sheet and a lower sheet and such shearing force may result in jamming by the upper sheet. To prevent this, as shown in FIG. 12a, the upper sheet and the lower sheet are stuck to each other with an adhesive at a top edge of the upper and lower sheets in the feeding direction and at opposite edges of the sheets parallel to the feeding direction. Since the laminated recording medium is treated as a single sheet, an appropriate image can be obtained on the upper sheet and/or the lower sheet without generating any slip between upper and lower sheets when printing is carried out on the bonded medium. The above-described adhesive is selected from low adhesive agents to easily peel the upper sheet from the lower sheet after printing.

FIG. 12b shows another example of a laminated recording medium in which a top edge of the upper and lower sheets thereof in the feeding direction is stuck to one another and opposite edges of sheets parallel to the feeding direction are stuck by a plurality of adhesive spots. FIG. 12c shows still another example of a laminated recording medium in which top and rear edges of the upper and lower sheets thereof in the feeding direction are respectively stuck to one another. These examples as shown in FIGS. 12b and 12c have the same effect as that shown in FIG. 12a.

[Embodiment 2 of Recording Medium]

Figure 13:
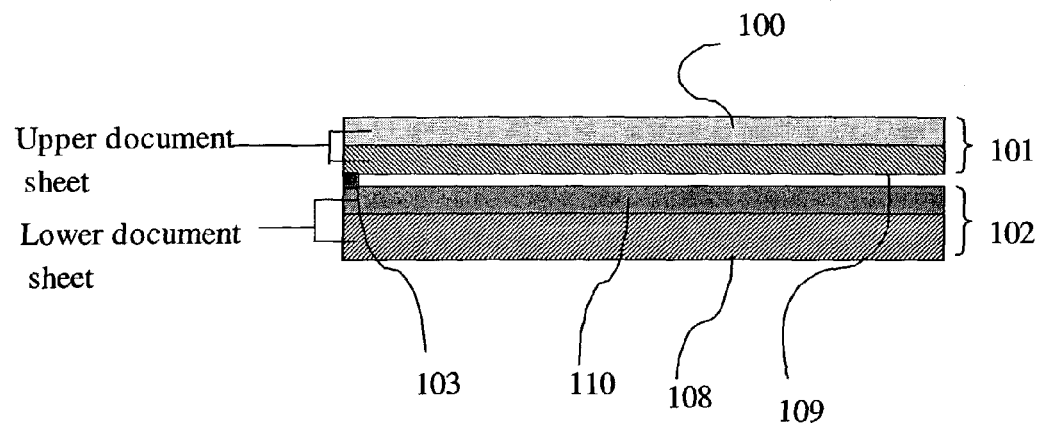
FIG. 13 is a sectional view of a laminated medium in another embodiment.

FIG. 13 shows another embodiment of a laminated recording medium having an upper sheet 101 and lower sheet 102. A transfer layer 109 including a developer such as bisphenol A, which is described in the Japanese laid open patent application No. 2001-180123, is applied to a back surface of upper sheet 101 so that a thermal transfer receiving layer applied to a top surface of lower sheet 102 causes generation of a visible image in color by heat energy propagating through upper sheet 101. The developer is defined by a material that does not generate color by itself but causes a specific material to generate color when the material contacts to or combines with the specific material. Applied to the top surface of lower sheet 102 is a thermal transfer receiving layer 110 including a coloring agent, such as leuco dye, which generates color when the coloring agent contacts to or combines with the developer, and a binder including resin or wax. When heat energy generated by thermal print head 51 mounted on printer 6 is applied to lower sheet 102 through upper sheet 101 in response to a print pattern data, the developer of transfer layer 109 applied to the back surface of upper sheet 101 combines with the coloring agent of thermal transfer receiving layer 110 applied to the top surface of lower sheet 102 in the print pattern and thus the print image pattern is visibly formed on lower sheet 102 resulting from the chemical combination between the developer and the coloring agent.

A same result as described above can also be obtained using a modified laminated recording medium which is formed from upper sheet 101 with a transfer layer 109 comprising a coloring agent and lower sheet 102 with a thermal transfer receiving layer 110 comprising a developer.

[Embodiment 3 of Recording Medium]

Figure 14:
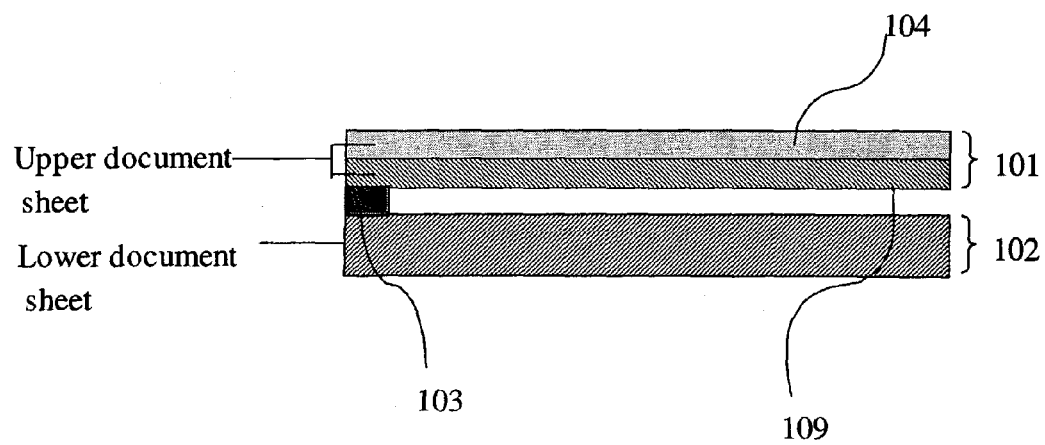
FIG. 14 is a sectional view of a laminated medium in still another embodiment.

FIG. 14 shows another embodiment of a laminated recording medium 100 similar to the abovementioned medium. In this embodiment, a transfer layer including a thermal coloring agent is not applied to the top surface of upper sheet 101, but a thermal transfer layer 109 is applied to the back surface of upper sheet 101, instead. A base paper of upper sheet 101 is, for example, a high quality paper. Thermal transfer layer 109 is formed with similar contents to the ink layer of a thermal transfer ink ribbon which has a waxed ink. The waxed ink is generally comprised of a coloring agent, a binder resin, a wax, and an additive, and thus, the composition of waxed ink of a conventional thermal transfer ink ribbon can be used. For example, the waxed ink layer comprising carbon black weighing 10, carnauba wax weighing 30, paraffin wax weighing 30, ethylene-vinyl acetate copolymer weighing 10, and additive weighing 5, is coated with 4 g/m$^2$ by hot-melt method.

When thermal energy generated by thermal print head 51 mounted on printer 6 shown in FIG. 6 is applied to the laminated recording medium in response to the print pattern data, a print image can be obtained on lower sheet 102 because the waxed ink coated on the back surface of upper sheet 101 is fused with thermal energy responding to the print pattern and is transferred to the top surface of lower sheet 102. On the other hand, a print image can be formed on the upper sheet 101 by an ink jet print method, a wire dot print method, a thermal transfer print method and so on. However, if the thermal transfer print method is used, heat energy applied to the waxed ink on a thermal transfer ink ribbon should be controlled so that the printing on the top surface of upper sheet 101 through the thermal transfer ink ribbon is effected but the printing on the top surface of lower sheet 102 through the thermal transfer layer 109 coated on the back surface of upper sheet 101 is not effected at the same time.

[Embodiment 4 of Recording Medium]

FIG. 15 shows a recording medium on which a guarantee card and a user registration card is printed in side-by-side fashion. The guarantee card and the user registration card is separable from one another along with perforated line 80. The recording medium is a high quality paper on which both the guarantee card and the user registration card can be printed by a thermal transfer ink ribbon. In this case, printer 6, shown in FIG. 6, having a first print unit 50 and a second print unit 60 is not needed to print both cards.

Figure 16:
FIG. 16 is a plan view of the recording medium shown in FIG. 15 that data fields of guarantee card and user registration card are filled with data.

FIG. 16 shows a print sample which indicates different print images formed on the guarantee card and the user registration card. Using this recording medium, a system similar to the above-described document sheets issuing system is also applied. Print data including a product name, a model number, a manufacturing serial number, a name of retailer and its address are printed on a guarantee card and a user registration card during production processes at the maker prior to the delivery of products.

In the above-described embodiments, a mailing card expiration date is previously printed on the user registration card 102a. However, the mailing card expiration date may be printed by printer 6 when the above-described print data are printed during production processes. A plurality of bar codes may be used to record information of a product including a manufacturing serial number and the plurality of bar codes may be printed on a carton label although such information is coded into a two-dimensional code and the code is printed on the carton label in the above embodiment. A retailer may input to its computer information of a product by simply reading the bar codes on the carton label through a reader. Thus, the retailer can eliminate a troublesome input operation through a keyboard when the retailer receives the product. In addition, if a retailer can access through Internet to a database at a maker and obtain information of a product from the database, the retailer may read the manufacturing serial number from the bar code and obtain information of a product from the database of the maker using the manufacturing serial number as a key. Such information may be downloaded to its computer and the troublesome input operation can also be eliminated.

[Embodiment 5 of Recording Medium]

Another example of the laminated recording medium including upper and lower document sheets is described in which the upper sheet and the lower sheet is partly bonded to each other with a peelable adhesive, as described above. The upper sheet is a single base paper, such as a high quality paper or a glassine paper on which no coloring agent which generates color when a mechanical pressure is applied thereto is coated. A pressure sensitive layer is coated on the top surface of the lower sheet. The pressure sensitive layer is comprised of microcapsules containing a coloring agent, such as leuco dye, and a developer. When a mechanical pressure generated by an impact dot print method responding to print pattern data is applied to the lower sheet through the upper sheet, microcapsules to which the mechanical pressure is applied are collapsed and coloring agent in each microcapsule flows out. The coloring agent reacts on the developer and generates color on the top surface of the lower sheet to form a visible image. On the other hand, an ink jet print method may be used to print data on the upper sheet.

A laminated recording medium including an upper sheet and lower sheet is exemplified in the above embodiments. A plurality of lower sheets, such as, e.g., thermal recording sheet, may be laminated as a modified laminated recording medium. An identical image is printed on the respective lower sheets if such a modified laminated recording medium is used.

According to the above-described present invention, a maker can reduce inventory by manufacturing products upon receiving a supply ordering from a seller and the seller can eliminate a troublesome operation in which the seller fills out document sheets, such as, e.g., guarantee card, attached to the product when selling the product to a customer.

The present invention has been described with respect to specific embodiments. However, other embodiments based on the principles of the present invention should be obvious to those of ordinary skill in the art. Such embodiments are intended to be covered by the claims.

What is claimed is:

1. A laminated recording medium which is printed by at least two different recording methods and is inevitably attached to a product, comprising:
    an upper document sheet having a first surface on which no composition generating color by applying a thermal energy exists, the upper document sheet having a thermo-transmissibility;
    a lower document sheet having a second surface on which a thermal print agent generating color by applying the thermal energy exists, the upper document sheet being laminated on the lower document sheet; and
    an adhesive temporarily sticking the upper document sheet to the lower document sheet in order that the upper document sheet is peelable from the lower document sheet,
    wherein an image is printed on the second surface of the lower document sheet when the thermal energy is applied to the lower document sheet through the upper document sheet.

2. A laminated recording medium, which is printed by at least two different recording methods and is inevitably attached to a product, comprising:
    an upper document sheet having a top surface on which no composition generating color by applying a thermal energy exists and a back surface on which a thermal transfer layer including at least a developer exists, the upper document sheet having a thermo-transmissibility;
    a lower document sheet having a top surface on which a thermal transfer receiving layer including a coloring agent exists, the upper document sheet being laminated on the lower document sheet; and
    an adhesive temporarily sticking the upper document sheet to the lower document sheet in order that the upper document sheet is peelable from the lower document sheet,
    wherein an image is recorded on the top surface of the lower document sheet when the thermal energy is applied to the top surface of the upper document sheet and thus the coloring agent of the top surface of the lower document sheet contacts or combines with the developer transferred from the back surface of the upper document sheet by the application of the thermal energy.

3. A laminated recording medium, which is printed by at least two different recording methods and is inevitably attached to a product, comprising:
    an upper document sheet having a top surface on which no composition generating color by applying a thermal energy exists and a back surface on which a thermal transfer layer including at least a coloring agent exists, the upper document sheet having a thermo-transmissibility;
    a lower document sheet having a top surface on which a thermal transfer receiving layer including a developer exists, the upper document sheet being laminated on the lower document sheet; and
    an adhesive temporarily sticking the upper document sheet to the lower document sheet in order that the upper document sheet is peelable from the lower document sheet,
    wherein an image is recorded on the top surface of the lower document sheet when the thermal energy is applied to the top surface of the upper document sheet so that the developer of the top surface of the lower document sheet contacts or combines with the coloring agent transferred from the back surface of the upper document sheet.

4. A laminated recording medium, which is printed by at least two different recording methods and is inevitably attached to a product, comprising:
    an upper document sheet having a top surface on which no composition generating color by applying a thermal energy exists and a back surface on which a thermal transfer layer exists, the upper document sheet having a thermo-transmissibility;
    a lower document sheet having a top surface, the upper document sheet being laminated on the lower document sheet; and an adhesive temporarily sticking the upper document sheet to the lower document sheet in order that the upper document sheet is peelable from the lower document sheet, wherein an image is printed on the top surface of the lower document sheet when the thermal energy is applied to the top surface of the upper document sheet so that the thermal transfer layer of the back surface of the upper document sheet is transferred to the top surface of the lower document sheet.

5. A laminated recording medium, which is printed by at least two different recording methods and is inevitably attached to a product, comprising:

an upper document sheet having a top surface on which no composition generating color by applying a mechanical pressure exists and having a mechanical pressure transmissibility;

a lower document sheet having a top surface on which a pressure sensitive coloring agent generating color by the application of the mechanical pressure exists, the upper document sheet being laminated on the lower document sheet; and an adhesive temporarily sticking the upper document sheet to the lower document sheet in order that the upper document sheet is peelable from the lower document sheet, wherein an image is printed on the top surface of the lower document sheet when the mechanical pressure is applied to the top surface of the lower document sheet through the upper document sheet.

* * * * *